United States Patent
Swet

[15] 3,676,581

[45] July 11, 1972

[54] OPTICAL SCANNING SPACECRAFT SYSTEM

[72] Inventor: Charles J. Swet, Mount Airy, Md.

[73] Assignee: The United States of America as represented by the Secretary of the Navy

[22] Filed: Feb. 1, 1971

[21] Appl. No.: 111,345

[52] U.S. Cl. ..................... 178/5.4 R, 178/6, 178/DIG. 20, 178/5.4 ES
[51] Int. Cl. .................................................. H04n 1/46
[58] Field of Search ................... 178/DIG. 20, 6.8, 5.2 R; 356/83, 96

[56] References Cited

UNITED STATES PATENTS

| | | | |
|---|---|---|---|
| 3,504,975 | 4/1970 | White | 178/5.2 R |
| 3,560,642 | 2/1971 | Schroader et al. | 178/6.8 |

*Primary Examiner*—Robert L. Richardson
*Assistant Examiner*—Richard K. Eckert, Jr.
*Attorney*—R. S. Sciascia, J. A. Cooke and R. J. Erickson

[57] ABSTRACT

A method and apparatus for mapping the surface of a celestial body employs a spin stabilized spacecraft which is placed in a highly eccentric orbit about the celestial body to be mapped and whose spin axis is always Earth oriented. An optical line-scanning system is mounted aboard the spacecraft normal to the spacecraft spin axis and repeatedly sweeps out an elongated image strip or swath on the surface of the celestial body; the image swath advancing over the surface of the body as the spacecraft spins during its orbit about said body. The optical scanning system includes a mechanical slit which is dimensioned such that when it is projected onto the surface of the celestial body it forms one line of the desired image swath. Suitable spectral dispersing means receives the light passing through the mechanical slit and disperses it onto a mosaic of photosensors. The photosensor mosaic is arranged to produce output voltages indicative of the light intensity of the light image occurring at preselected spectral regions of the image. The highly eccentric orbit into which the spacecraft is placed about the celestial body permits close-up and broader coverage pictures to be obtained during each orbit of the spacecraft. It also helps to reduce the velocity change requirements for planetary capture, and lengthens the orbital period to permit continuous transmission to Earth of a complete picture at modest data rates.

10 Claims, 9 Drawing Figures

INVENTOR.
CHARLES J. SWET
BY
*JACooke*
ATTORNEY

INVENTOR.
CHARLES J. SWET

INVENTOR.
CHARLES J. SWET

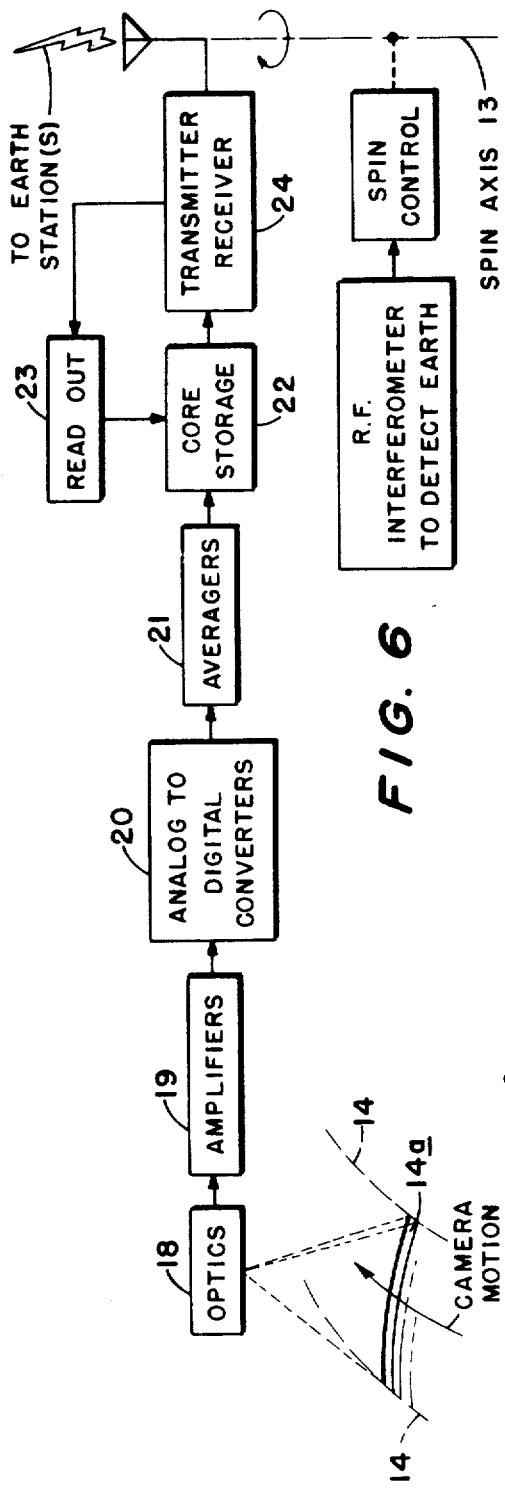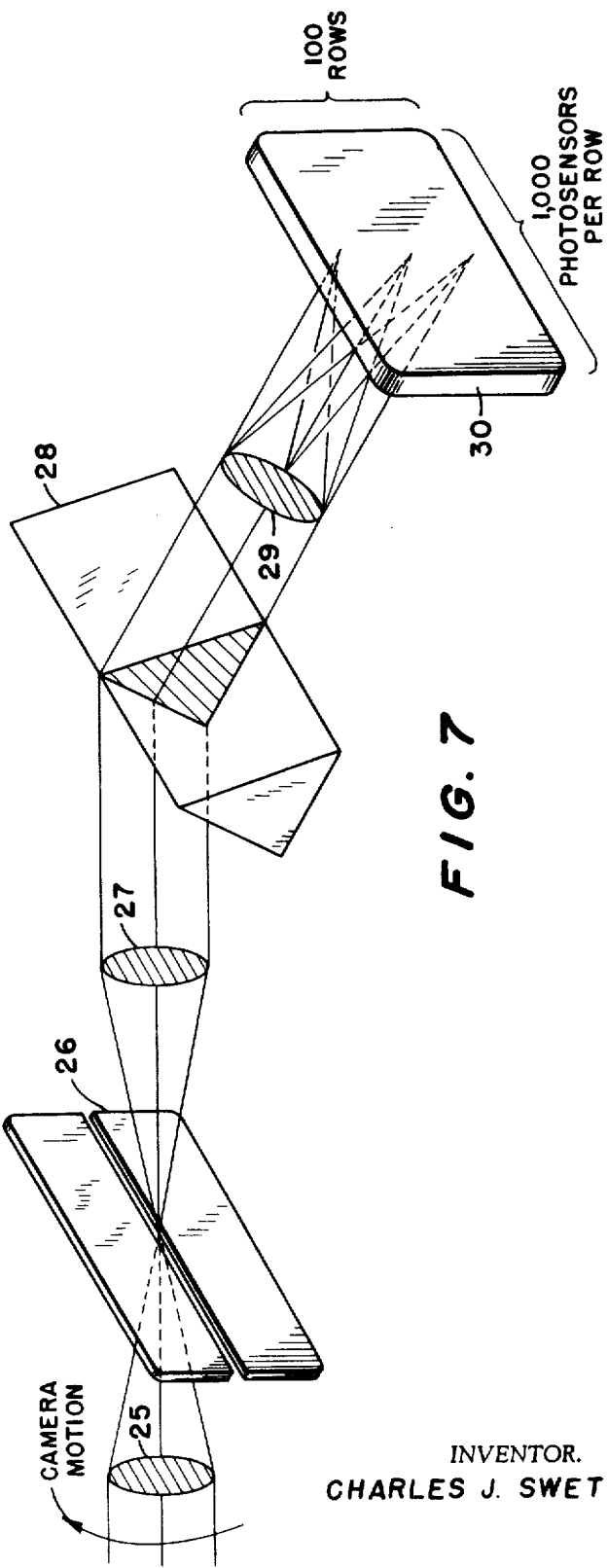

INVENTOR.
CHARLES J. SWET

OPTICAL SCANNING SPACECRAFT SYSTEM

BACKGROUND OF THE INVENTION

In recent years, attempts have been made to obtain mappings of the visible planetary surface of some of the other planets in the solar system; e.g., the 1969 Mars Mariner fly-by. Unfortunately, these previous mapping missions have been of only limited success and have required relatively complex spacecraft control and optical mapping systems. By way of example, on all of the previous Mariner interplanetary spacecraft, active 3-axis attitude control, star sensing apparatus, and trainable antennas and solar cell arrays have been required.

In addition, there have been other drawbacks associated with the previously proposed interplanetary spacecraft mapping missions. Conventional planetary surface scanning techniques, for example, call for fairly circular orbits and therefore necessitate close control of the orbit around the planet to be mapped. Moreover, relatively large optics were required in order to obtain high resolution mapping, along with relatively complex multiple-optic systems if color mapping were desired.

SUMMARY OF THE INVENTION

It is proposed in accordance with the present invention to provide a relatively simple and inexpensive spacecraft control system and apparatus for a spacecraft launched from Earth and capable of mapping, in color, the surface of another planet in the solar system, for example, but which overcomes many of the above-mentioned short-comings of the previously proposed interplanetary spacecraft mapping missions.

More specifically, it is proposed in accordance with the present invention to utilize a spin-stabilized, Earth-oriented spacecraft which orbits about the planet to be mapped with an Earth-looking communications antenna fixed on the spacecraft spin-axis. RF interferometry is utilized to sense the Earth and all necessary attitude control is thus provided by periodically torqueing the spacecraft spin-axis. A radially mounted camera scans most of the planetary surface during every orbit, offering a wide selection of picture opportunities at various zenith angles and illuminations. Straight-down looks occur twice per orbit, and by placing the spacecraft in a highly eccentric orbit, it is possible to obtain both high resolution close-ups and wide coverage far shots from the same camera.

Another virtue of the highly eccentric orbit proposed in accordance with the present invention is its modest velocity change ($\Delta v$) requirement for planetary capture, as compared to capture into a circular orbit. In order to further reduce the over-all mission $\Delta v$ requirements; i.e., the sum of the velocity imparted by the booster for the interplanetary trajectory and that produced by the spacecraft for capture into a planetary orbit of the desired characteristics, launching of the spacecraft preferably occurs as the Earth approaches intercept with the plane of the other planet's orbit about the sun. As a result, the transfer ellipse (during interplanetary flight) and the orbit of the planet to be mapped are coplanar and therefore no energy need be wasted on an initial plane change.

In accordance with the present invention, the color mapping system provided on the spacecraft is also relatively simple and inexpensive, yet capable of providing both good resolution close-up coverage and supplementary broader far coverage of the planetary surface. More specifically and in accordance with the present invention, the surface of the planet to be mapped is repeatedly line-scanned by an optical system mounted radially aboard the spacecraft to scan normal to the spacecraft's spin axis.

The optical system comprises a mechanical viewing slit which is dimensioned such that, when it is projected back onto the surface of the planet, it defines one line of an elongated image swath having the desired resolution dimensions. This image swath advances over the planetary surface primarily due to the spin motion of the spacecraft. Suitable spectral dispersing means, such as a prism or diffraction grating, receives the light passing through the mechanical slit and spectrally disperses the line image coming from the planetary surface onto a mosaic of solid state photosensors. The photosensors are arranged to produce output voltages corresponding to the light intensity contained in preselected spectral regions (or colors) in the incoming light image. These voltages are then averaged, digitized and applied to a suitable core storage, for example, and subsequently encoded onto a carrier frequency for transmission back to an Earth receiving station, where image reconstruction would take place. The proposed optical system avoids the film processing and storage problems associated with previously proposed photographic techniques and the severe image motion problems that afflict a sequential snapshot camera type spacecraft system.

In view of the foregoing, one object of the present invention is to provide a relatively simple and inexpensive method and apparatus for mapping a planetary surface, by means of an orbiting spacecraft.

A further object of the present invention is to provide a spacecraft mounted mapping system whereby both close-up and broader coverage color mappings of a planetary surface can be obtained with a single optical system.

A still further object of the present invention is to provide a planetary mapping system employing a spin-stabilized, Earth-oriented spacecraft to perform optical line scanning of the planetary surface.

Another object of the present invention is to provide an interplanetary spacecraft mapping mission having minimum velocity change ($\Delta v$) requirements for obtaining capture of the spacecraft into the orbit around the planet to be mapped and during the interplanetary phase of the mission.

Other objects, purposes and characteristic features of the present invention will in part be pointed out as the description of the present invention progresses and in part be obvious from the accompanying drawings, wherein:

FIG. 6 is a block diagram of the spacecraft carried apparatus employed in the proposed optical scanning spacecraft system of the preset invention;

FIG. 7 is a diagrammatic illustration of one embodiment of the optics included in the spacecraft carried apparatus in accordance with the present invention;

Figure 1:
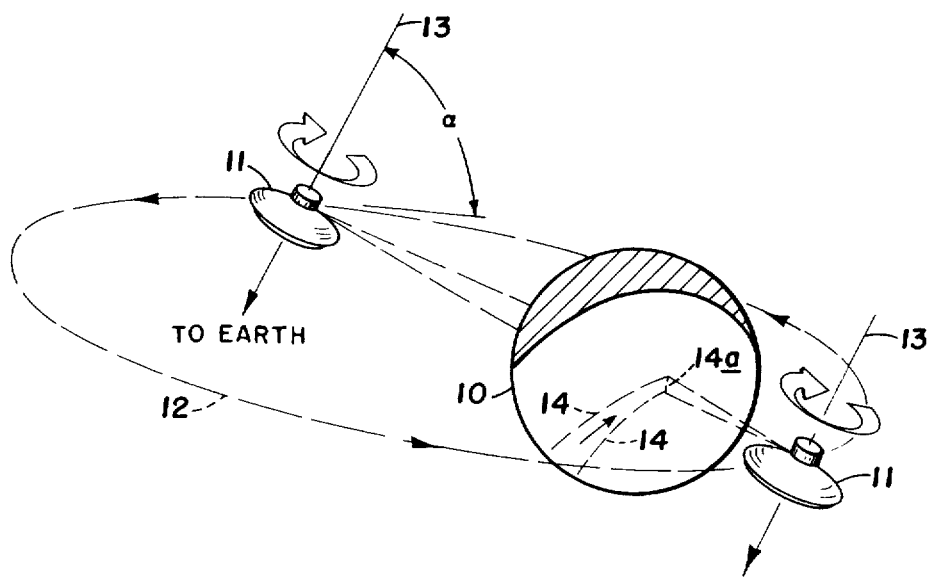
FIG. 1 is a pictorial illustration of a spacecraft orbiting a planet or the like in accordance with the proposed optical scanning spacecraft system of the present invention.

Referring now to FIG. 1 of the drawings, it is proposed in accordance with the present invention, to provide a spacecraft system for optically scanning or mapping the surface of a celestial body, such as the illustrated planet 10, by orbiting thereabout a spin-stabilized, Earth-oriented spacecraft 11. The spacecraft 11 is preferably placed in a highly eccentric orbit, represented by the dashed line 12, about the celestial body 10 so as to provide both close-up and wide coverage viewing of the surface of the celestial body 10 from the same spacecraft-mounted optical scanning system or camera. By means of conventional small thrusters (not shown), the spin-stabilized spacecraft 11 is periodically torqued, about spin axis 13, to maintain the desired spacecraft attitude, i.e., with the spin-axis pointing towards Earth. A communications antenna (not shown) is preferably positioned along the spin-axis 13 so that it too always faces the Earth and accordingly maintains uninterrupted communications between the spacecraft and the Earth control stations, except when the celestial body being scanned intervenes.

The spacecraft 11 is provided with a radially mounted optical scanning system or camera, to be described in more detail hereinafter, which scans most of the planetary surface of the body 10 during each orbit, offering a wide selection of picture opportunities at various zenith angles and illuminations. Straight-down "looks" always occur twice per orbit, and the highly eccentric orbit makes it possible, as previously mentioned, to obtain both high resolution closeups and wide coverage far shots with the same optical scanner or camera. Moreover, the argument of perigee and the spin axis orientation relative to the orbital plane (angle α in FIG. 1) will naturally be continually changing due to seasonal variations and orbital precession, for example, to make every visible spot on the planetary surface ultimately viewable from both peri-apsis and apo-apsis; whereas the long orbital period (for example, 62 hours) assures extended periods of uninterrupted communication with Earth.

Figure 2:
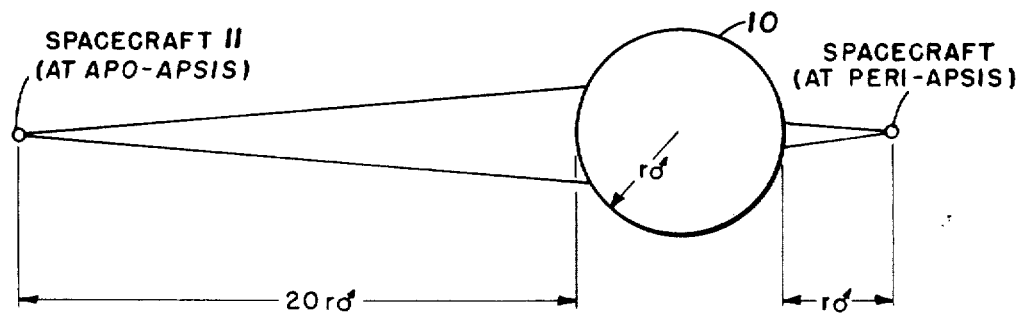
FIG. 2 is a diagrammatic illustration of the orbital phase of the proposed spacecraft system showing the ability of the proposed system to accomplish both close-up and broad coverage scanning or mapping of the planetary surface.

In FIG. 1, the radially mounted camera (see FIGS. 6 and 7 for details) views a succession of lines which generate an elongated image swath, designated as 14, which continuously advances over the surface of the planet 10 as the spinning spacecraft 11 orbits thereabout. The size of the image swath viewed by the spacecraft-carried optical scanning system or camera depends, among other things, upon the field of view of the optical system. For example, in FIG. 2 of the drawings wherein the proposed optical scanning system of the present invention is illustrated for mapping the surface of the planet Mars, with the spacecraft altitude at peri-apsis being established at one Martian radius ($r_o$) and, at apo-apsis, being established at 20 (20) Martian radii, a camera having a fan-shaped field of view 1.6° (in the plane of the paper) by 0.0016° (in the direction of spacecraft oribital motion) might typically be used to establish an instantaneous image line 14a 1,000 resolution elements long (the width of the swath 14) and one resolution element wide. At peri-apsis, this would correspond to an instantaneous line approximately fifty (50) nautical miles long and five one-hundredths (0.05) nautical miles wide at the surface of planet 10 and, at apo-apsis, a image line approximately one thousand (1,000) nautical miles long and one (1) nautical mile wide.

Another virtue of the highly eccentric orbit shown in FIG. 1 and contemplated in accordance with the present invention is its modest velocity change ($\Delta v$) requirement for planetary capture. For example, with closest spacecraft approach occurring at peri-apsis of the intended orbit, the required velocity change to place the spacecraft into the highly eccentric orbit is only about 3,700 feet per second, as oppossed to approximately 6,550 feet per second velocity change for the lowest energy capture into a circular orbit.

Figure 3:
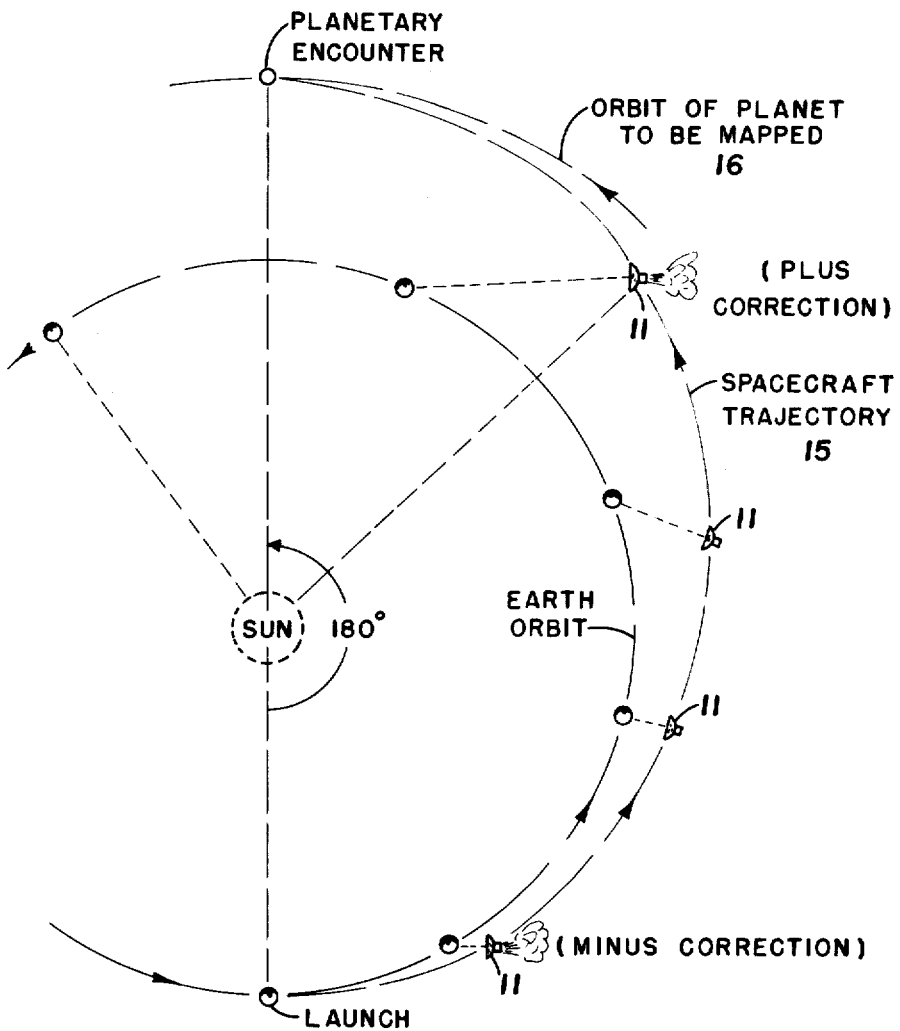
FIG. 3 is a diagrammatic illustration of the interplanetary phase or flight of the proposed spacecraft system of the present invention.

Referring now to FIG. 3 of the drawings, it is proposed in accordance with the present invention that the spacecraft 11 be launched when the Earth approaches intercept with the orbital plane of the celestial body to be mapped (e.g. Mars), so that the elliptic transfer trajectory 15 and the orbit 16 of the planet to be mapped are coplanar and therefore no energy need be wasted on an initial spacecraft plane change.

More specifically, if the planet Mars were to be mapped in late 1971, for example, launch for a conventional trajectory would occur on approximately May 15 and encounter with the Mars sphere of influence by the spacecraft would nominally occur approximately two hundred (200) Earth days after launch, following one hundred and fifty-five degrees (155°) of heliocentric travel. Since planetary intercept could occur, therefore twenty-five degrees (25°) before planar intercept, each milliradian of crossplane error in the initial trajectory would create a miss distance of nearly 60,000 miles. It was therefore found desirable to provide the capability for crossplane error correction on the previous Mariner spacecraft and this is one reason that 3-axis attitude control was required on such spacecraft.

As previously mentioned, in accordance with the present invention, the transfer trajectory 15 is reshaped from that previously proposed and, instead, the trajectory 15 traverses a central angle of nearly 180 degrees (180°) so that planetary encounter and planar intercept are nearly coincident and therefore initial crossplane error has virtually no effect on the miss distance. This of course would increase the mission energy requirement, thereby reducing the spacecraft payload propellant fraction but it would also obviate the need (during the interplanetary phase, at least) for having an active 3-axis attitude control system, a star sensor, trainable antennas and trainable solar cell arrays; all of which were necessary on the previous Mariner interplanetary spacecraft. During the interplanetary phase of the proposed spacecraft mission, shown in FIG. 3, a conventional rocket engine (not shown) aboard the spacecraft 11 and having controllable impulse and a multiple re-start capability would be utilized to make a succession of progressively finer in-plane trajectory corrections, such as illustrated in FIG. 3. Moreover, during the hyperbolic approach, this same rocket engine would provide retrothrust for planetary capture, with timing and total impulse selected to accommodate the actual conditions at planetary encounter. Additionally, after capture, the engine would be utilized to adjust the orbital parameters as and if required.

Figure 4:
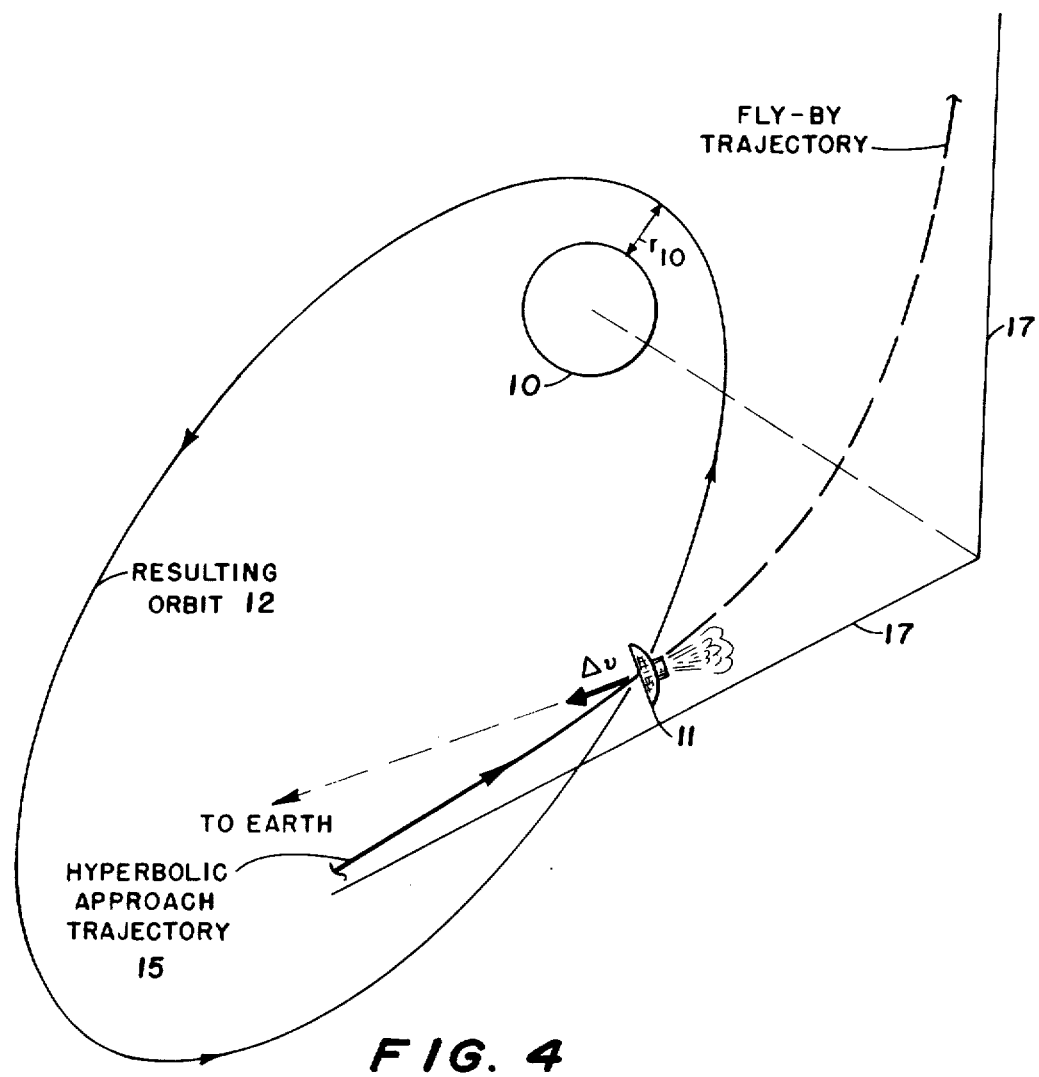
FIG. 4 is a diagrammatic illustration of a typical capture phase of the proposed spacecraft system during which the spacecraft is placed in orbit about the planet to be mapped.
Figure 5:
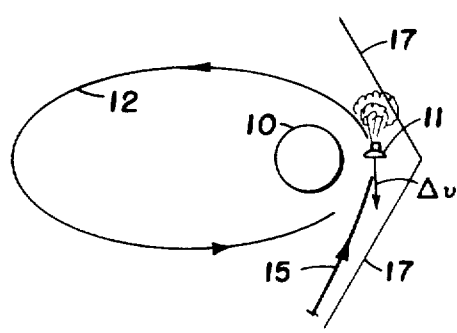
FIG. 5 is a diagrammatic illustration of an ideal capture phase for the proposed spacecraft system.

As illustrated in FIG. 4, the plane of the asymptotes 17 nominally coincides with the near-ecliptic transfer trajectory 15, with the Earth-oriented thrust axis lying within a degree or so (for Mars) of that plane at the time of capture. This results in an orbital inclination of about twenty-five degrees (25°) with approximately forty-two percent (42 percent) coverage of the planetary surface at normal viewing incidence and one hundred percent (100 percent) at elevations greater than about twenty-two degrees (22°). Out of plane trajectory errors tend to change orientation of this asymptotic plane but only to the extent that the interplanetary trajectory 15 deviates from a true Hohmann transfer; i.e., from a heliocentric travel of 180°. In the example discussed previously; i.e., a 1971 Mars mapping mission, the minimal energy transfer of approximately one hundred and fifty-five degrees (155°) could be converted to a Hohmann transfer by launching 24 days early, totally nullifying any out of plane errors but requiring about fourteen percent (14%) more $\Delta v$ for capture into the desired orbit which, it will be recalled, calls for a spacecraft altitude at peri-apsis on the order of one planetary radius (designated as $r_{10}$ in FIG. 4) and an apo-apsis altitude of approximately 20 planetary radii. This velocity penalty is comparable to that incurred by merely letting the plane of the asymptotes 17 shift approximately thirty degrees (30°) away from the spin-stabililized thrust vector, suggesting that smaller adjustments in the launch date would suffice. In any event, the theory of planetary capture maneuvers has been fully described by K.A. Ehricke in *Spaceflight Vol. II, Dynamics*, published by B. van Nostrand Co, Inc. in 1962 and suffice it to say that the preceding discussion, together with FIG. 4, clearly demonstrates that conditions for capture into a highly eccentric orbit such as 12 are less demanding than for capture into a circular orbit and that the earth-pointing thrust axis need not be tangent to the approach hyperbola 15 at its vertex, as in the ideal capture manuver illustrated in FIG. 5.

Having thus described the interplanetary and capture phases of the proposed planetary mapping mission, attention will now be turned to the apparatus which is carried aboard the spacecraft 11 and which actually performs the optical scanning or mapping of the surface of the planet 10. More specifically and with reference to FIG. 6 of the drawings, the spacecraft-carried apparatus includes a suitable optical system or camera designated at 18 which is positioned in the spacecraft 11 such that its fan-shaped field of view extends radially from the spacecraft 11 as shown in FIG. 1 and sweeps out a path or image swath on the planetary surface as indicated by the arrow and dashed lines 14 in FIGS. 1 and 6 as the spinning spacecraft 11 orbits the planet 10. On the other hand, it will be recalled, when looking straight down the optics 18 "see," at a given instant, only the narrow strip or image line 14a on the planetary surface that is one thousand resolution elements long and one resolution element wide. As previously mentioned, the actual planetary surface area covered by the instantaneous line image 14a depends upon the altitude of the spacecraft 11 above the surface and might, in the Mars mapping example, vary between one thousand square nautical miles (1,000 × 1) and two and one-half square nautical miles (50 × 0.05).

Figure 8:
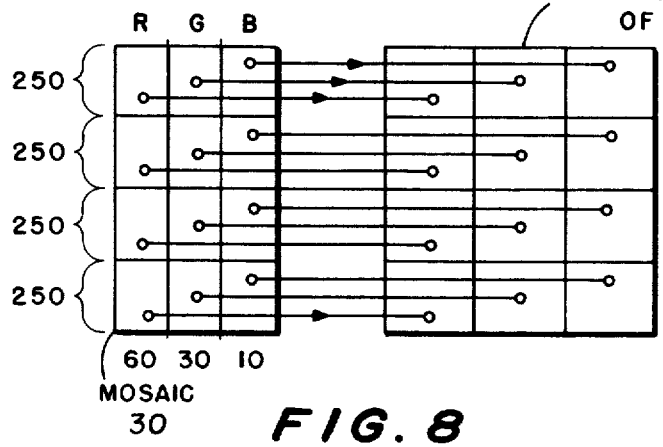
FIG. 8 is a diagrammatic illustration of one manner of processing the outputs from the mosaic of photosensor elements which comprises a portion of the spacecraft carried optical system.
Figure 9:
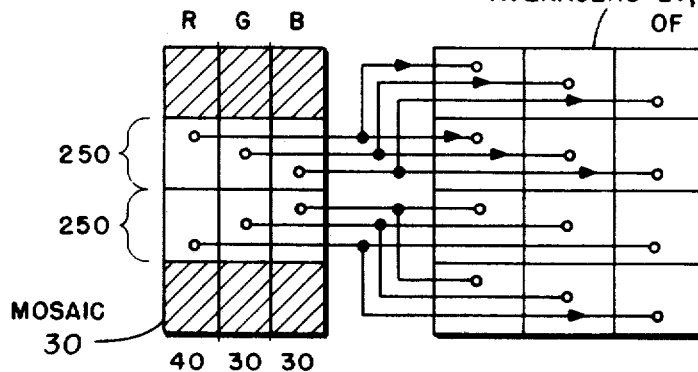
FIG. 9 is a diagrammatic illustration of an alternate method of processing the photosensor outputs.

In a manner to be described in detail hereinafter, the optical system 18 functions to produce, for each resolution element contained in the length of the elongated line image 14a, a plurality of output voltages representing the analogs of the image intensities within selected spectral regions of interest in the input line image. These analog voltages are subsequently amplified, at 19, and applied to analog-to-digital converter apparatus 20 of conventional design which converts these analog signals into corresponding digital data which, in turn, are applied to averaging circuitry 21, of conventional design. At circuitry 21, the total digital data associated with each of the selected spectral regions are averaged together to produce, for each such region, a single digital data word representing the mean image intensity for a specific resolution at that region. As illustrated in FIGS. 8 and 9, the above-described amplifying, digitizing and averaging operations can, if desired, be accomplished by initially dividing the line image lengthwise into a plurality of image segments (four in FIG. 8 and two in FIG. 9) rather than processing the entire line image as a whole. The digital output data from the averaging circuit networks 21 are finally applied to and stored on a suitable core storage 22 having a twelve million ($12 \times 10^6$) bit capacity, for example. Associated with the core storage 22 is a conventional read-out control apparatus 23, well-known to those skilled in telemetry systems, which responds to readout control messages received at 24 from the Earth station(s) and causes the stored digital data information to be encoded onto a suitable carrier frequency for transmission, via transmitter-receiver unit 24, back to the Earth station(s) where the image is re-constructed according to any of several well-known techniques. As previously mentioned, the communications antenna is aligned with spin axis 13 and maintained pointing at Earth by periodically torqueing the spacecraft, by means of the illustrated spin control apparatus, in response to control from RF interferometry apparatus.

Referring now to FIG. 7 and the details of the optical system 18, the input line image from the planetary surface is received at input lens 25 and contains one thousand resolution elements along its length and is one resolution element wide (in the direction of camera motion), as defined by the size of mechanical slit 26; i.e., the output image from the lens 25 is applied through a mechanical slit 26 so that its (the slit 26) dimensions when projected back onto the planetary surface define the size of the image swath 15. A second lens 27 receives and collimates the line image passing through the mechanical slit 26 and applies such image to a suitable spectral dispersing device such as diffraction grating or the illustrated prism 28 which spectrally disperses the input line image transversely of its length; i.e., it divides each resolution element in the line image into its various wavelength components. In FIG. 7, it should be noted, no attempt has been made to show the entire length of the input line image which is processed, at any given instant, by the optics 17. Rather, in order to simplify the drawings, the light ray diagram of FIG. 7 represents only a single resolution element in the input line image.

The spectrally dispersed image output from the prism 28 is them focused, by lens 29, onto a mosaic 30 of solid state photosensor devices, such as phototransistors. By way of example, the mosaic 30 might be comprised of one hundred (100) rows, with one thousand (1,000) phototransistors per row, on two mil centers. The prism 28 thus would spectrally disperse each resolution element in the instantaneous field of view or line image onto one hundred (100) of the solid state sensors disposed side-by-side to receive adjacent wavelength components of the spectrally disposed image. Where there is only a limited number of spectral regions of interest (or colors), the outputs of each of several preselected photosensor groups in mosaic 30 would be averaged together or paralleled to produce a voltage corresponding to the mean energy in that spectral region, rather than individually process the output of each of one hundred (100) photosensors for each resolution element. For example, sixty (60) of the one hundred (100) sensors associated with each resolution element of the input line image could be utilized to produce a "red" voltage representing the average image intensity in the red spectral region for that element; thirty (30) could be utilized to produce a "green" voltage; and ten (10) could be utilized to produce a "blue" voltage, as illustrated in FIG. 8. In this manner, the detrimental effects of individual sensor failures are minimized; i.e., the use of many sensors per spectral region or "color" of interest provides a built-in system redundancy check.

Assuming that there are three spectral regions of interest, as previously discussed, and that the spacecraft 11 has a stabilizing spin rate of approximately one thousand (1,000) revolutions per orbit, the one thousand (1,000) resolution elements comprising each input image would simultaneously be sensed in each of the three spectral regions while the field of view is advancing the width of a resolution element (0.05 nautical miles for an altitude of 1 Mars radius) in approximately 1 millisecond. Accordingly, every millisecond, the $10^5$ phototransistors making up the typical mosaic 30 would discharge their accumulated electrons to produce three thousand (3,000) mean voltages which are digitized, as previously described when discussing FIG. 6, and placed in core storage 22. In other words, one such voltage signal would be produced to represent the mean energy present in each of the three spectral regions for each of the 1,000 resolution elements contained in the input line image.

In 1 second, the field of view advances approximately fifty (50) nautical miles (for the 1 Mars radius altitude) and the spacecraft-mounted optical system or camera 18 scans 1,000 image lines 14a on the planetary surface. As a result, a square picture or mapping (50 n. mi × 50 n. mi., at peri-apsis) containing $10^3 \times 10^3$ or $10^6$ resolution elements is produced and is represented by $3 \times 10^6$ mean voltage signals which might, for example, be stored in core storage as $12 \times 10^6$ bits; i.e., four bits per voltage signal. This stored mapping data could be read out continuously from the storage 22 at any desired rate for up to one orbital period. Thus, the bit rate for the 62 hour circum-Mars orbit could be as low as 53 bits/second. The above-described mode of operation of the proposed spacecraft-carried optical scanning or mapping system for producing the (50 × 50 ) square map or picture in one second is diagrammatically illustrated in FIG. 8 of the drawings. On the other hand, the proposed system can alternatively be switched by suitable command to operate as shown in FIG. 9 of the drawings and produce a rectangular picture or map comprising the same total number of resolution elements. For example, the system when operated as in FIG. 9 could produce a picture twenty-five (25) nautical miles wide and one hundred (100) nautical miles long in two seconds; rather than the square map produced by the FIG. 8 configuration in one second.

Other modifications, adaptations and alterations of the present invention are of course possible in light of the above teachings. It should therefore be understood at this time that the invention defined by the appended claims may be practiced otherwise than as specifically described.

What is claimed is:

1. A system for optically mapping the surface of a planet or the like comprising, a spin stabilized spacecraft which is launched from Earth and whose spin axis is oriented towards Earth, said spacecraft having an eccentric orbit about said planet, and an optical system mounted aboard said spacecraft to scan normal to said spacecraft spin axis an elongated image swath which advances over the surface of said planet due at least in part to the spinning of said spacecraft about said spin axis, said elongated image swath being formed from a succession of instantaneous line images each having a length corresponding to the width of the image swath and being dimensioned to contain a predetermined number of resolution elements associated with said optical system and to provide an instantaneous coverage of the planetary surface determined by the distance of said spacecraft from said surface, said optical system including means for converting the light incoming from each of said line images into corresponding video voltage signals representing the light intensity at selected spectral regions of each of said line images forming said elongated image swath.

2. The system specified in claim 1 wherein said optical system comprises, a mechanical slit representing a light passage which when projected onto the surface of said planet defines the dimensions of said instantaneous line image and being effective to pass the light incoming from said line image, means receptive of the line image light passing through said mechanical slit for dispersing said line image transversely of its length according to the spectral content of said line image, and photosensor means disposed to receive said spectrally dispersed line image for generating an output voltage signal indicative of the spectral content of said image at each preselected spectral region of interest within said image.

3. The system specified in claim 2 wherein said image dispersing means is prism means.

4. The system specified in claim 2 wherein said photosensor means is a plurality of solid state photosensors arranged as a mosaic, said mosaic containing a predetermined number of said photosensors for each resolution element in said line image.

5. The system specified in claim 4 wherein said photosensors are phototransistors.

6. The system specified in claim 4 wherein the individual photosensors within said predetermined number of photosensors associated with each resolution element of said input light image are disposed to receive and be associated with different wavelength components of interest within said spectrally dispersed light image, each photosensor producing a voltage output signal indicative of the light image intensity occurring at the associated wavelength for the associated resolution element of said light image, and further including, means connected to combine the voltage output signal from the photosensors associated with adjacent wavelengths for producing, for each spectral region of interest, a digital signal representing the average value of the input image light intensity within the associated spectral region of said incoming light image.

7. The system specified in claim 6 and further including, storage means for storing said digital signal for each spectral region of interest in said incoming light image, and means operably connected to said storage means for communicating to a receiving station on Earth information regarding the digital signals stored in said storage means.

8. The optical mapping system specified in claim 1 wherein said spacecraft is launched when the Earth approaches intercept with the orbital plane of the planet to be mapped and the interplanetary trajectory of said spacecraft traverses substantially 180° of heliocentric travel.

9. The optical mapping system specified in claim 1 wherein said eccentric orbit is dimensioned such that the ratio of the distances from the spacecraft to the surface of said planet to be mapped at apo-apsis and peri-apsis is substantially twenty to one.

10. The optical mapping system specified in claim 1 wherein each line image forming said image swath is one resolution element wide and one thousand resolution elements long.

* * * * *